(12) United States Patent
Chalmer et al.

(10) Patent No.: US 6,687,903 B1
(45) Date of Patent: Feb. 3, 2004

(54) INHIBITING STARVATION IN A MULTITASKING OPERATING SYSTEM

(75) Inventors: Steven R. Chalmer, Weston, MA (US); Steven T. McClure, Northboro, MA (US); Brett D. Niver, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 587 days.

(21) Appl. No.: 09/605,626

(22) Filed: Jun. 28, 2000

(51) Int. Cl.$^7$ ................................. G06F 4/00
(52) U.S. Cl. ........................ 718/100; 718/102
(58) Field of Search .................. 709/101, 102, 709/103, 200, 201, 203

(56) References Cited

U.S. PATENT DOCUMENTS 6,085,215 A * 7/2000 Ramakrishnan et al. .... 709/102
6,542,940 B1 * 4/2003 Morrison et al. ............. 710/22

OTHER PUBLICATIONS

Fixed Priority Scheduling of Periodic Tasks With Varying Execution Priority, Michael Gonzales Harbour et al., 1991 IEEE.*

Solutions for Some Practical Problems in Prioritized Pre-emptive Scheduling, Lui Sha et al., IEEE, 1986.*

* cited by examiner

Primary Examiner—Majid Banankhah
(74) Attorney, Agent, or Firm—Choate, Hall & Stewart

(57) ABSTRACT

Disclosed is inhibiting process starvation in a multitasking operating system by providing a first type of scheduling event at periodic timer intervals, providing a second type of second scheduling event in response to a running processes voluntarily relinquishing the processor, and, in response to a scheduling event, replacing an old process with a new process only if the old process has run for more than a predetermined amount of time. The predetermined amount of time may be one half of the timer interval. The system described herein provides a small kernel that can run on a variety of hardware platforms, such as a PowerPC based Symmetrix adapter board used in a Symmetrix data storage device provided by EMC Corporation of Hopkinton, Mass. The core kernel code may be written for the general target platform, such as the PowerPC architecture. Since the PowerPC implementation specific modules are well defined, the system may be quite portable between PowerPC processors (such as the 8260 and 750), and should prove relatively easy to port to any PowerPC based Symmetrix adapter board/CPU combination. The kernel may also be ported to run on other RISC machines (Hitachi SH series) and can be ported to CISC architectures.

23 Claims, 13 Drawing Sheets

INHIBITING STARVATION IN A MULTITASKING OPERATING SYSTEM

BACKGROUND OF THE INVENTION

1. Field of the Invention

This application relates to the field of computer operating systems and more particularly to the field of multitasking-based operating systems that may be used on a microprocessor.

2. Description of Related Art

Operating systems may be used to facilitate sharing of a processor among a variety of separate processes. The operating system manages the sharing of the processor by providing each process with separate time slices for executing code.

For microprocessors, and for microprocessors used in device oriented applications, such as for data communication, it is often useful to provide an operating system that can manage processor sharing among the processes that handle different aspects of running the device. However, such operating systems may provide a number of drawbacks, such as requiring a significant amount of stack space that needs to be managed for each separate process. In addition, different mechanisms may be used for preempted task swapping (i.e., task swapping that uses interrupts) versus cooperative task swapping (i.e., processes relinquish the processor voluntarily). Furthermore, many operating systems are hardware and architecture specific so that an operating system implemented on one processor may not be easily be ported to another processor.

In addition, even in instances where it would be advantageous to use multiple process schedulers, many operating systems use a single process scheduler because of difficulties associated with changing process schedulers during run time. Context swapping in these operating systems may be cumbersome and, when both cooperative and preemptive techniques are used together, it may be difficult to avoid process starvation of a current process that is swapped in when a previous process voluntarily relinquishes the processor and the current process is subsequently preempted.

It is desirable to provide an operating system that overcomes the deficiencies discussed above.

SUMMARY OF THE INVENTION

According to the present invention, inhibiting process starvation in a multitasking operating system includes providing a first type of scheduling event at periodic timer intervals, providing a second type of second scheduling event in response to a running processes voluntarily relinquishing the processor, and, in response to a scheduling event, replacing an old process with a new process only if the old process has run for more than a predetermined amount of time. The predetermined amount of time may be one half of the timer interval. Further included may be determining if the old process has run for more than a predetermined amount of time by using clock slice checking. Further included may be determining if the old process is running in response to a second type of scheduling event and setting a flag in response thereto. Further included may be determining if the old process has run for more than a predetermined amount of time by checking the state of the flag. Further included may be, if the flag has been set, rerunning the old process in response to a first type of scheduling event. Further included may be clearing the flag following rerunning the old process. Further included may be, if the flag has been set and the old process has run for less than the predetermined amount of time, rerunning the old process in response to a first type of scheduling event. Further included may be clearing the flag following rerunning the old process. Further included may be determining if the old process is running in response to a second type of scheduling event and if the old process has run for less than the predetermined amount of time and setting a flag in response thereto. Further included may be determining if the old process has run for more than a predetermined amount of time by checking the state of the flag. Further included may be, if the flag has been set, rerunning the old process in response to a first type of scheduling event. Further included may be clearing the flag following rerunning the old process. The predetermined amount of time may be one half of a timer interval.

The system described herein provides a small kernel that can run on a variety of hardware platforms, such as a PowerPC based Symmetrix adapter board used in a Symmetrix data storage device provided by EMC Corporation of Hopkinton, Mass. The core kernel code may be written for the general target platform, such as the PowerPC architecture. Since the PowerPC implementation specific modules are well defined, the system may be quite portable between PowerPC processors (such as the 8260 and 750), and should prove relatively easy to port to any PowerPC based Symmetrix adapter board/CPU combination. The kernel may also be ported to run on other RISC machines (Hitachi SH series) and can be ported to CISC architectures.

The system described herein may be implemented using approximately 8000 lines of commented source code and approximately 1200 lines of assembly code (e.g., PowerPC assembly code) that may be used for a vector table and context swapping routines. The rest of the source code may be written in a higher-level language, such as C. The system core kernel may include a context swapping model, a process and threading model, a locking and process synchronization model, a simple scheduler, base system calls, and a basic device driver model.

The system described herein does not necessarily require specific device drivers, specific boot up or processor initialization code, a specific memory management model (for example, sbrk, malloc and free), specific networking code, and/or specific applications, although some of these functions may be useful for the system. Since the system is meant to function as an embedded operating system rather than as a general purpose base platform, everything not directly connected to essential kernel services may be designed for each implementation. For example, even if inter-process communications were not part of the core kernel, a very rich set of signals, semaphores and process synchronization functions may be provided as part of the core kernel to allow virtually any model of inter-process communication to be incorporated.

The system may be built using the Cygnus GnuPRO tool. The Cygnus GnuPRO libraries (e.g., the multi-threaded libc) may be used to provide basic routines such as string functions, etc. The kernel may use standard calling conventions based on traditional Unix API calls (open, close, read, write, ioctl, etc.) and traditional Unix libc system calls (printf, strcpy, atoi, etc.). There are some calls that may be specific to the system described herein.

The system described herein is fully 32-bit, pre-emptive and/or cooperative, multi-threaded, and multi-tasking. However, the system may run in a single address space. In some embodiments, there is no definable "user" or "kernel" memory space enforced by the operating system. In addition, in some embodiments, the kernel memory areas may be statically defined, thus reducing the need for dynamic memory allocation. However, although there may be no kernel support for such routines as sbrk( ), malloc( ) and free( ), any task thread may employ analogous functions as desired. For example, a TCP/IP stack application can manage its own buffer space, and provide callable functions for buffer management.

In order to run on many different types of hardware, the system described herein supports a very simple and powerful organization that includes CPU initialization and boot code, a CPU vector table, a context swapping model, a scheduler interrupt service routine, a process/threading model, critical regions (non-preemptable areas), a scheduler, a simple locking mechanism, process synchronization, a device driver model, system calls, and general API's. Some of these items may be hardware specific, but comprise a very small portion of the kernel. The modules for these items may be written in assembly language. The rest of the items may all be written in a high level language, such as C. With the exception of the context block information held for each process, the routines may be non-hardware specific, thus greatly enhancing kernel portability.

The system described herein exhibits many benefits. For example, processes need not carry around enough stack space to support a context swap, since context swaps may be made using very little, if any, stack space. When there are many processes, the amount of memory saved may be considerable. In addition, since the maximum number of interrupts that can be stacked may be generally well-known at compile time, the number of nested contexts may be known, and thus the maximum number of context blocks may be determined and may be statically allocated. The use of statically allocated context blocks and stack blocks may greatly enhance the debugging process because each process's stack frame may be isolated, along with the process state and therefore it is not necessary to "guess" which parts of a system stack frame belong to which process. The kernel itself does not need a stack of its own. Parts of the kernel may use their own small stacks, such as the scheduler which runs as a pseudo-process (but also could run as a process in other embodiments), but there is no requirement for a special "system only" stack. All interrupt service routines may start with interrupts disabled. Thus, the decision of whether to re-enable interrupts may be deferred to run-time, provided that the maximum number of nested contexts is not exceeded.

Interrupt services may be designed such that there is a very small ISR that runs when the interrupt is taken, with the bulk of the functionality being deferred to a process. Under this scheme, the role of the ISR may be to flag process(es) that it should run. Since processes may run with interrupts enabled (under most circumstances), this allows the scheduling algorithm and processes to be the major factors determining system responsiveness, rather than ISR processing and context swapping time.

DETAILED DESCRIPTION OF THE PREFERRED EMBODIMENT

Figure 1:
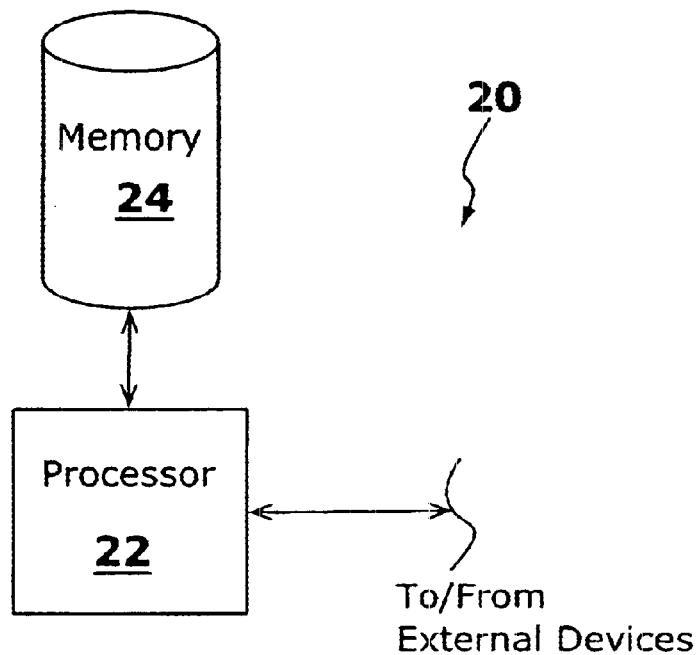
FIG. 1 is a schematic diagram showing a processor coupled to a memory according to the system described herein.

Referring to FIG. 1, a schematic diagram 20 shows a processor 22 coupled to memory 24. The processor 22 may be any one of a number of conventional, commercially available, processor devices (with corresponding support and interface circuitry), such as the power PC processor provided by Motorola, Inc. Similarly, the memory 24 represents conventional digital computer memory such as ROM, RAM, and/or other types of memory devices that may be accessed by the processor 22.

The processor 22 may also include connections 26 to and from external devices (not shown) controlled by the processor 22. The devices coupled to the processor 22 may include I/O devices, communication devices, and/or any other devices that are controllable by the processor 22. In one embodiment, the processor 22 is part of an RFID adapter board used in connection with a Symmetrics Data Storage device provided by EMC Corporation of Hopkinton, Mass. However, it will be appreciated by one of ordinary skill in the art that the system described herein may be adapted for use in any application where a processor is programmed with multi-tasking (multi-process) software to perform processor-related functions.

Figure 2:
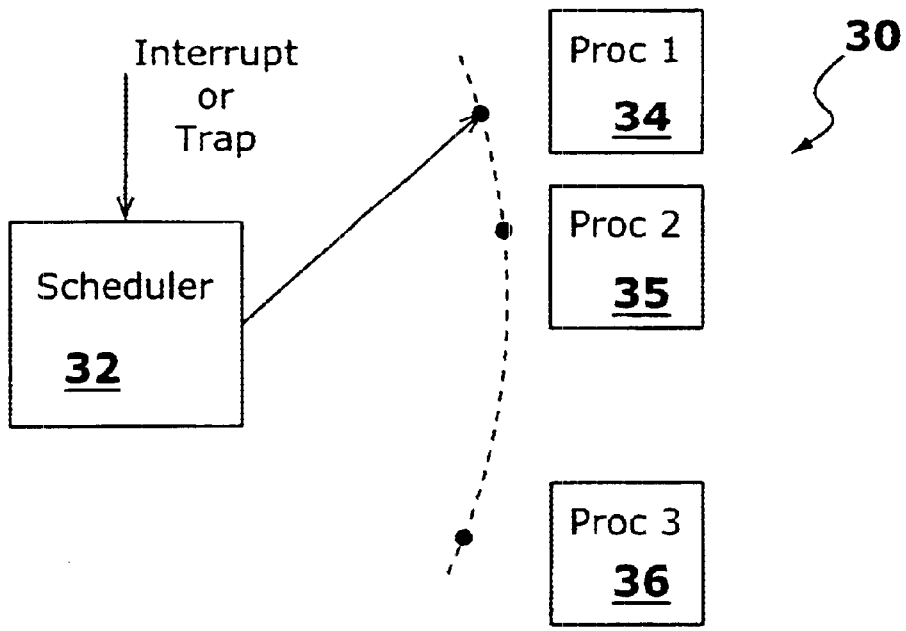
FIG. 2 is a schematic diagram illustrating operation of a scheduler and various processes according to the system described herein.

Referring to FIG. 2, a schematic diagram 30 figuratively illustrates operation of a scheduler 32 in a multi-tasking operating system having a plurality of processes 34–36 associated therewith. In effect, the scheduler 32 "runs" each of the processes on the processor 22 by causing the program counter of the processor 22 to point to an address of the code corresponding to one of the processes 34–36. As described in more detail below, switching among processes may also involve a variety of other operations that are performed.

The scheduler 32 may be invoked either by a periodic interrupt that causes the scheduler to run or by a software trap executed by a running process that causes the scheduler to run. In either case, the scheduler 32 examines the state of the currently running process and, if the process may be swapped out, swaps the process out and runs another process. There are a variety of known techniques for process swapping in a multi-process operating system. In an embodiment of the present invention, a round robin process swapping technique is used in conjunction with a time starvation avoidance algorithm, as described in more detail below. It may be appreciated by one of ordinary skill in the art that other process swapping techniques, such as techniques that provide different priority levels to some of the processes, and/or techniques that determine which processes have been swapped in least recently, may also be used.

Figure 3:
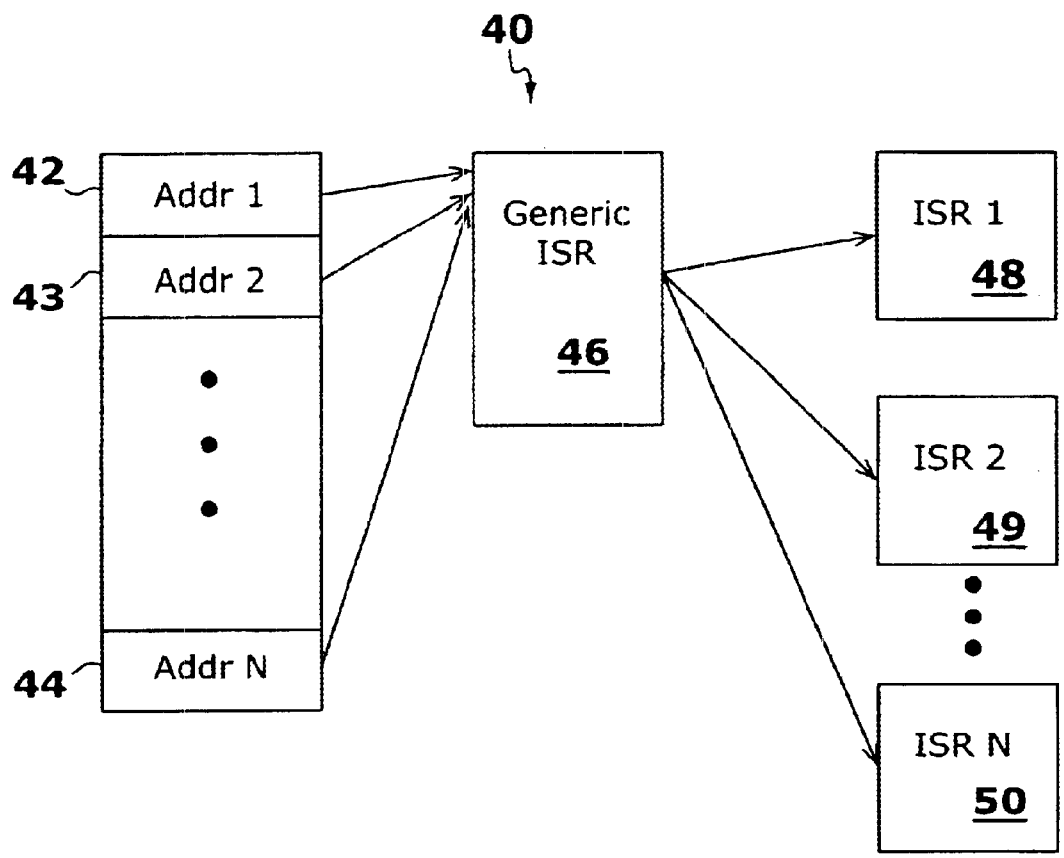
FIG. 3 is a schematic diagram illustrating a relationship between a vector table, a generic interrupt service routine, and other interrupt service routines, according to the system described herein.

Referring to FIG. 3, a diagram 40 illustrates operation of interrupt handling for the processor 22. As is known in the art, the processor 22 may be subject to various hardware interrupts and/or software interrupts (i.e., traps or software exceptions) that, in some instances, cause the current processing to stop and cause the program counter to be set to a particular address based on the identity of the interrupt. As shown in FIG. 3, a vector table 41 includes a plurality of addresses 42–44, each of which corresponds to a particular interrupt or type of interrupt. However, FIG. 3 also illustrates that, in some embodiments, all of the addresses 42–44 of the vector table 41 point to the same address: an address for a generic interrupt service routine 46. That is, for some embodiments of the invention, all of the interrupts (both hardware and software generated) cause the processor to jump to the same generic interrupt service routine 46 (i.e., cause the program counter to be set to a value corresponding to the beginning of the generic interrupt service routine 46). As will be described in more detail below, the generic interrupt service routine 46 first executes generic preamble code, then executes an interrupt service routine, and then executes generic postamble code.

In some embodiments, the generic interrupt service routine 46 may be able to determine the particular interrupt (or software trap) that caused execution of the generic interrupt service routine 46. Based on the identity of the particular interrupt, the generic interrupt service routine 46 may call one of a plurality of interrupt service routines 48–50 after the preamble code of the generic interrupt service routine 46 has been executed. A variety of techniques exists to determine which interrupt invoked the generic interrupt service routine, many of which are processor architecture specific. For example, the PowerPC has an interrupt scheme in which the program counter and machine state registers are saved into special registers and a value stored in a link special register, when suitably masked, provides an indicator of which interrupt caused the exception.

Once an appropriate one of the interrupt service routines 48–50 completes execution, control returns back to the generic interrupt service routine 46 to execute generic postamble code. The preamble code, postamble code, and a mechanism for calling the specific interrupt service routines 48–50 is described in more detail below. Note that portions of the generic interrupt service routine 46 and/or the interrupt service routines 48–50 may be written in a high level language, such as C. In some embodiments, all portions except the preamble code and the postamble code of the generic interrupt service routine 46 are written in a high level language while the preamble and postamble code is written in native assembly language of the processor 22. In some embodiments, it is useful for the interrupt service routines to be relatively short and simply set flags or wake up processes (described below) and then return. In architectures that use a stack for an interrupt return address, the initial portion of the interrupt service routine may pop the return address off of the stack and store the return address in an appropriate location for later use.

Figure 4:
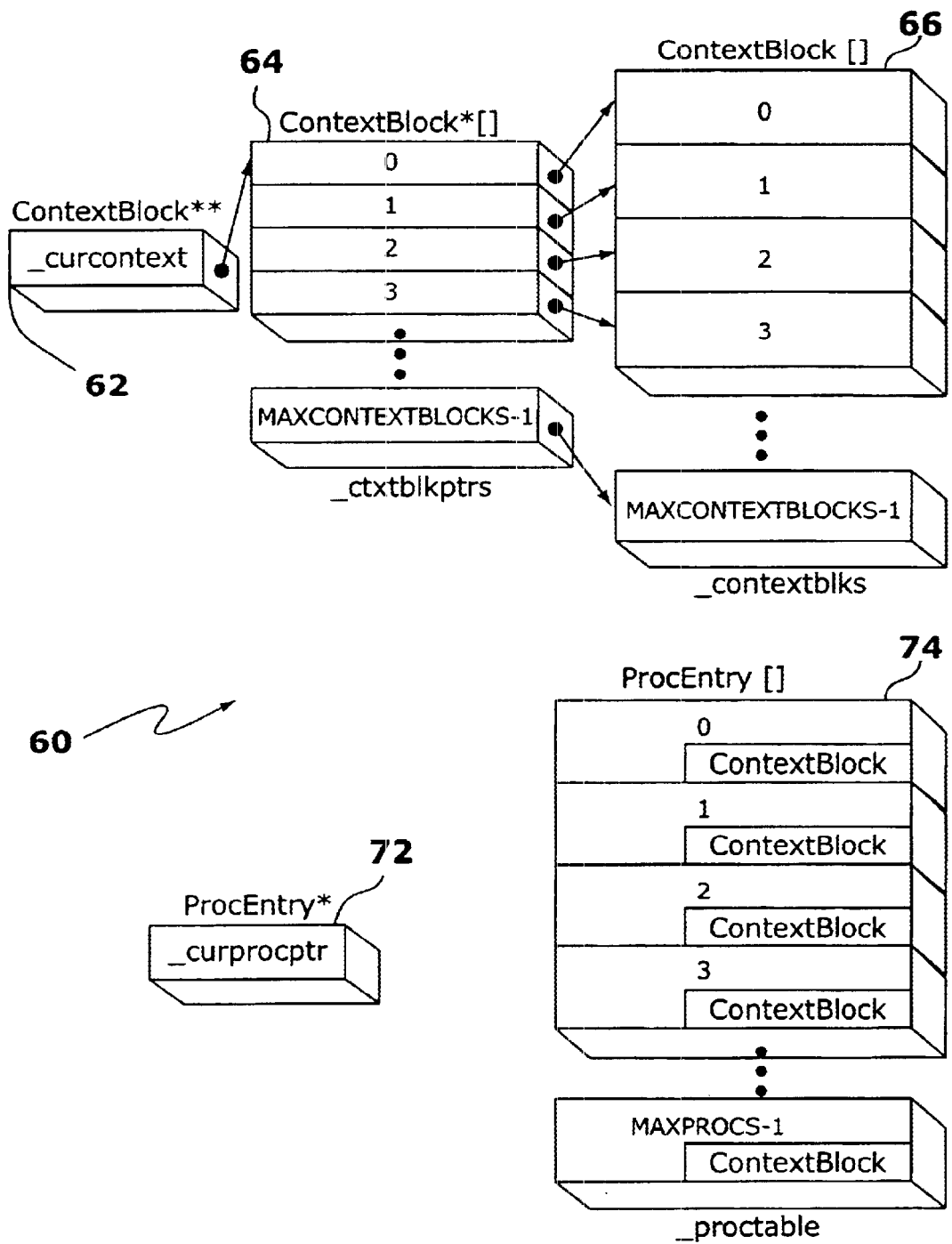
FIG. 4 is a schematic diagram illustrating data used by the system described herein.

Referring to FIG. 4, a diagram 60 illustrates relationships between data used by the generic interrupt service routine 46 and the scheduler 32 to handle scheduling and context swapping. Context swapping occurs when an interrupt (or software trap) causes the program counter to be changed to that of an interrupt service routine. Context swaps can be nested so that, for example, a first interrupt service routine interrupts a process and, prior to returning to the interrupted process, a second interrupt routine interrupts the first interrupt routine and so on. Often it is possible to know or predict a maximum amount of nesting of context swaps that will occur during run time.

The diagram 60 shows a current context pointer 62, an array of context block pointers 64, and an array of context blocks 66. The size of the arrays 64, 66 is determined according to a maximum amount of nesting for context blocks that are expected at run time. Note that, in some instances, it is possible to enforce a maximum amount of nesting by prohibiting further context swaps once the context swaps have nested to the maximum amount. Prohibiting further context swaps may be performed in a variety of ways familiar to one of ordinary skill in the art, such as by disabling interrupts. Note also that, instead of the arrays 64, 66, it is straight-forward for one of ordinary skill in the art to use alternative data structures, such as linked lists and/or tree structures.

Each of the context blocks in the array of context blocks 66 includes information that may be stored for a process in connection with a context swap. The information may include, for example, values of registers, values for flags, and a program counter. While the specific information stored in the context blocks 66 may be hardware specific, for purposes of the discussion herein it may be useful to view the array 66 as an opaque container that holds hardware-specific information about processes.

The diagram 60 also shows a current process pointer 72 and an array of process elements 74 where each of the elements in the array 74 includes code (or a pointer to code) for a particular process and includes a context block that is associated with the particular process.

In operation, the current context pointer 62 points to one of the context blocks pointers in the context block pointer array 64 and each of the context block pointers in the context block pointer array 64 point to one of the context blocks in the context block array 66. Similarly, the current process pointer 72 points to one of the processes in the array of process elements 74. The process to which the current process pointer 72 points is the one that is running (i.e., the one that has been scheduled by the scheduler.)

Figure 5:
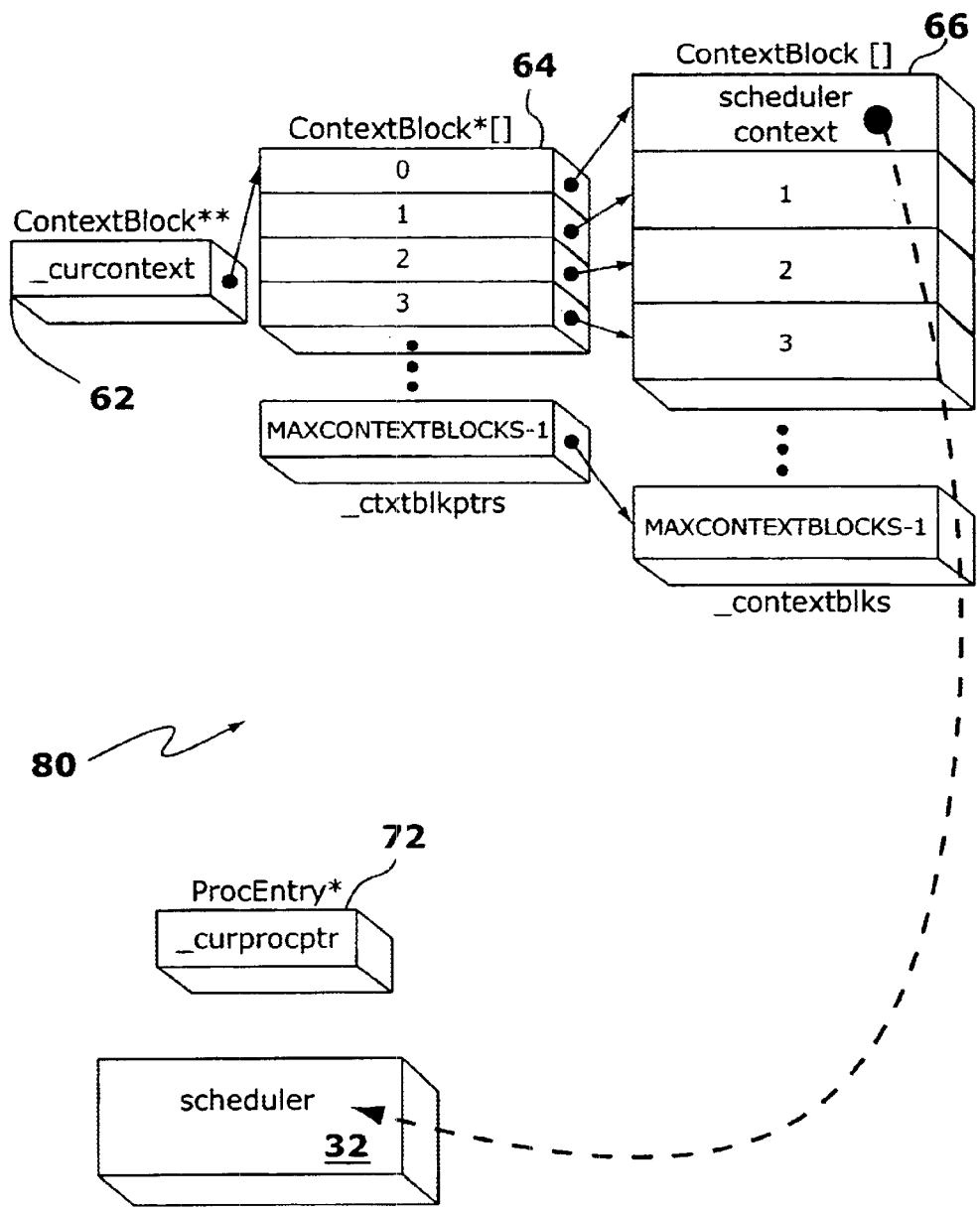
FIG. 5 is a schematic diagram illustrating initialization of data used by the system described herein.

Referring to FIG. 5, a diagram 80 illustrates the contents of various data structures upon initialization of the system. Each of the entries in the context block pointers array 64 is initialized to point to one of the context blocks in the context block array 66. In addition, the context of the scheduler 32 is loaded into the zeroth element of the context block array 66. As will become apparent from the discussion which follows, it is useful to place the context of the scheduler 32 in the zeroth element of the context block array 66.

Figure 6:
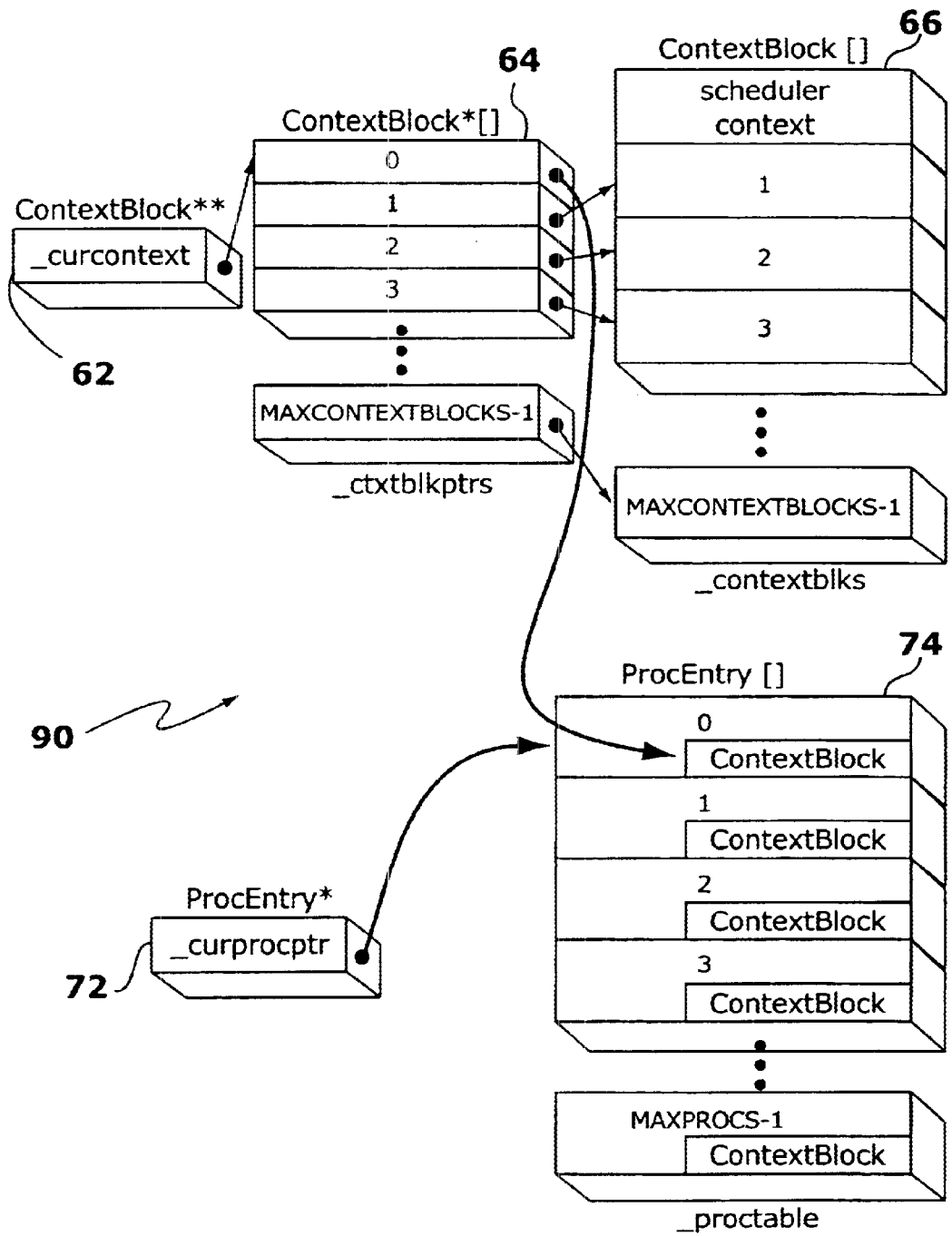
FIG. 6 is a schematic diagram illustrating a run time state of data used by the system described herein.

Referring to FIG. 6, a diagram 90 illustrates a run time state for the system disclosed herein. The current process pointer 72 points to one of the processes in the array of process elements 74, thus indicating the particular process in the array 74 that is currently running (i.e., is currently scheduled by the scheduler 32). The context block pointer for the zeroth element of the context block pointer array 64 points to the context block of the process that is currently running. Note, however, that the zeroth element of the context block array 66 contains context information for the scheduler 32.

In addition to the tables discussed above, there may be another array which holds blocks of memory used as stack space for each interrupt context. The blocks may be limited in size. Interrupt service routines requiring more space may need to supply their own, however, this may rarely be necessary, since context swapping takes almost no stack space. For example, in the PowerPC architecture, the system may make use of the four special purpose registers SPRG0–SPRG4, and take no stack space at all to swap context. Note that, for the two non-maskable interrupts of the PowerPC indicating fatal errors, a very small stack is required, but the fatal errors are effectively unrecoverable anyway. Also note that the arrays of stacks may be used only for ISRs and that processes may carry their own individual stacks passed in as arguments when the processes are started.

The system described herein may run in a single, flat address space. For the PowerPC architecture, this is currently a 32-bit implementation. For the system described herein, processes must be killed individually and not automatically reaped when the corresponding parent process dies. The system described herein may use traditional Unix APIs with which many programmers are familiar. Such an API model may provide robustness and easy access to information and implementations. In the Unix process model, each process within the system runs independently of other processes. The standard process APIs (kill, signal, getpid, etc.) are easy to use, and have a long history of utility.

For the system described herein, "processes" and "threads" are considered the same things—threads of execution—and the terms are used interchangeably. In order to start a process (thread) the creator calls a startproc( ) function, and provides a string name, entry point function, pointer to some memory for a stack, and possibly other arguments and parameters, depending upon the implementation. The process is then assigned a process id (PID), which is returned to the caller. The initialization and creation of new processes may be rather short, since no address space copying, generation or protection may be needed. A new thread may be a completely independent entity. The creator process need never deal with the new thread again, unless desired. There are additional calls allowing a process to wait for another process to finish, to set a signal on another process (or itself), or to cause another process to end outright. In addition, the creator of a new thread can itself die, and the newly created process(es) will continue to run without having to take any special steps to dissociate the new process from the parent.

The system described herein may also support critical regions. Each process may have an ability to make itself non-preemptable for any section of code up to and including the entire process. Note that processes are only non-preemptable when running. If a process blocks or calls a sleep function, other processes may be allowed to run. When the process becomes unblocked or returns from the sleep call, the process may return into the critical region. Thus, it may not be desirable to block or sleep while in a critical region, since a purpose of critical regions is not to let other processes run. Blocking may occur as result of a driver call, semaphore lock, or other process synchronization (described below). As a consequence, it may be desirable for critical regions to be kept very small. Processes may generally avoid driver calls while in critical regions, although critical regions may be used to advantage within driver code.

Critical regions may be implemented using a function, entreg, to enter a critical region and, to leave a critical region, a function call lvreg may be used. The entreg and lvreg calls may be implemented as up/down counters. Each call to entreg may require a matching lvreg call so that only when the last lvreg call is made will a process become preemptable again.

Figure 7:
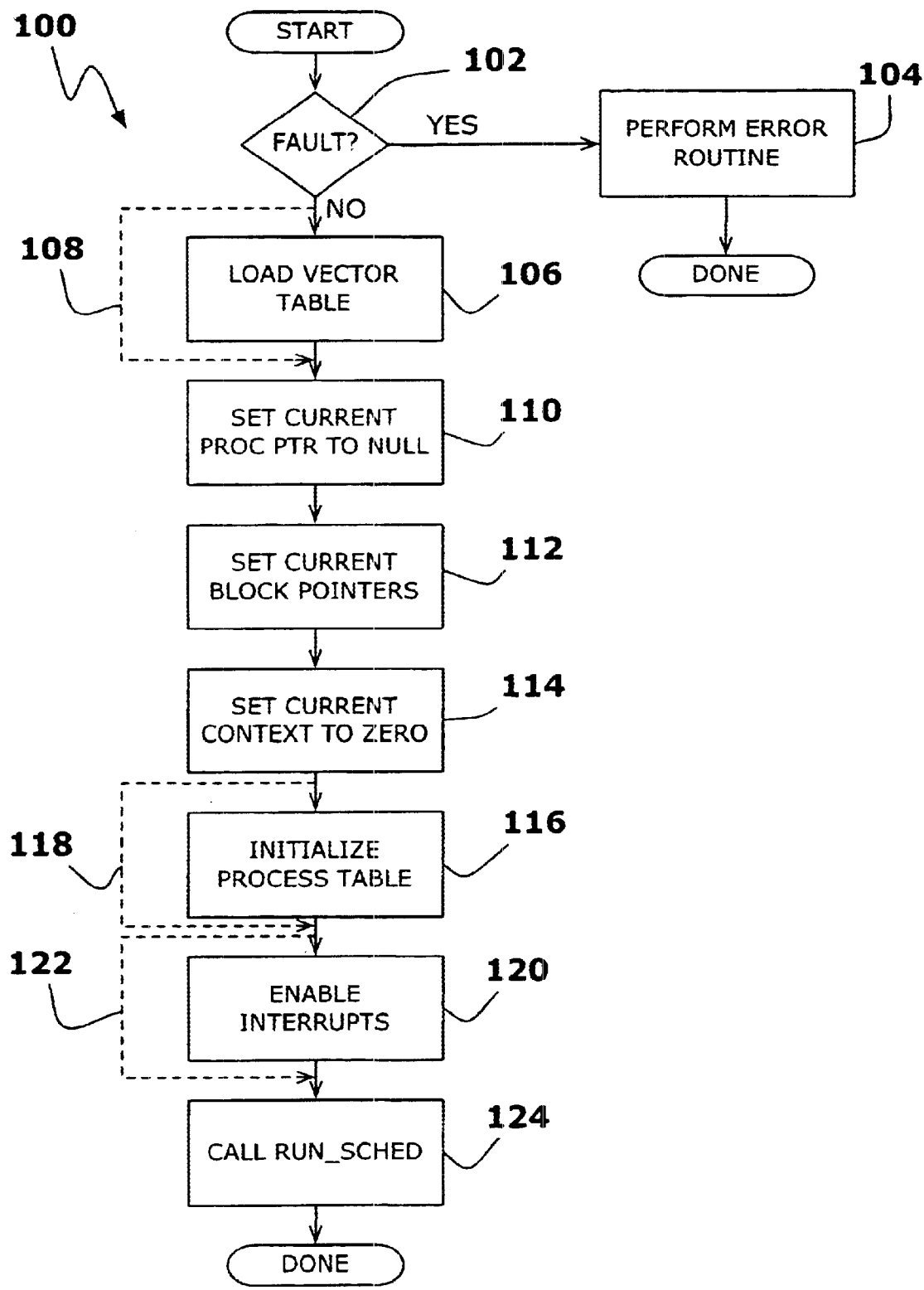
FIG. 7 is a flow chart illustrating steps performed in connection with initialization of the system described herein.

Referring to FIG. 7, a flow chart illustrates operation of initialization code for the processor 22 in connection with setting up the system discussed herein. The initialization code may be written in assembly language of the target platform, e.g., the assembly language of the Power PC processor. The initialization code may bring the processor 22 to a known state from a reset condition (i.e., a power up or a fault condition). There may be various entry points to the code depending on how the reset occurred. As discussed below, power-up states may be differentiated from watchdog resets or other fault conditions. There may also be special sequences involved with error recovery, which may be highly platform specific. The initialization code includes a set of functions that allow the processor 22 to participate in its own initial program load. This may be as simple as a single instruction jump to a known starting location when the system is executing out of ROM. In a more complicated system, the initialization code may include an initial loader that communicates with another system to load a final code image into memory locations.

Processing begins at a first test step 102, which determines if the reset condition that caused the initialization code to execute occurred because of a fault condition. If so, then control transfers to a step 104 where fault handling occurs. Fault handling is platform and application specific, but often includes halting operation of the system and providing an indication of the fault to the user and/or to other systems that communicate with the system at fault. Following the step 104, processing is complete.

If it is determined at the step 102 that there is no detected fault condition (i.e., the reset is due to a power up condition), then control passes from the step 102 to a step 106 to begin performance of the initialization sequence and setting up the system. At the step 106, the vector table 41 for the processor 22 is loaded. The vector table 41 may be specific to the target platform and may consist of actual code, or may simply be a table of pointers to code. As discussed above, all the entries of the vector table 41 may be loaded with the address of the generic interrupt service routine 46. In systems where interrupts are used, and in systems where software traps are used and the software traps (exceptions) use the vector table 41, the vector table 41 may be initialized to prevent interrupts and exceptions from causing the system to misbehave. Unless the vector table 41 is located in non-writable memory (e.g., ROM), it is not necessity to have the actual run-time code present for all the vectors. In some embodiments, it may be possible to modify the vector table 41 after the system is already operating. However, initialization of the vector table 41 prior to the system running places the system in a known state until the system can further modify the vector table 41.

As discussed elsewhere herein, the system can operate as a fully functional operating system in cooperative only mode, with no requirement for anything but rudimentary interrupt vector code. If the system uses a preemptive version of the scheduler 32, then a single periodic interrupt may be provided for that purpose. If a preemptive version of the scheduler 32 is used, the system may provide mechanisms to prevent preemption of any task and may prevent reentrance of the scheduler 32 by, for example, disabling interrupts while the scheduler 32 is running or by using a flag to indicate that the scheduler 32 is running. In some embodiments, a system trap (or software exception) may be used to directly invoke the scheduler 32, in addition to an optional periodic interrupt. In those embodiments, the preemption path may become essentially the same as the cooperative path.

Note that, in some embodiments, it may not be necessary to load the vector table 41 at the step 106 because the vector table 41 is stored in non-writeable memory (e.g., ROM) and/or because the system does not use a vector table (i.e., does not use hardware interrupts and the particular target platform uses a different mechanism to handle software exceptions). In instances where it is not necessary to load the vector table 41 at the step 106, processing control flows via a path 108 that does not include the step 106.

Following the step 106 (or the step 102 if the vector table is not loaded during initialization) is a step 110 where the current process pointer 72 is set to NULL, indicating that none of the processes are currently being run by the scheduler 32. Following the step 110 is a step 112 where context block pointers in the array 64 are all initialized by setting each pointer to point to a corresponding one of the blocks in the array of context blocks 66. That is, the Nth context block pointer is set to point to the Nth context block for each of the context block pointers and context blocks in the arrays 64, 66. Following the step 112 is a step 114 where the current context pointer 62 is set to zero (i.e., is set to point to the zeroth element of the array of context block pointers 64).

Following the step 114 is a step 116 where the array of process elements 74 is initialized with code. That is, in some embodiments, executable code for the array of process elements 74 may be loaded therein at initialization. For other embodiments, the array of process elements 74 may be provided in non-writeable memory (e.g., ROM), in which case the step 116 is not executed, as illustrated by a path 118. Following the step 116 (or the step 114) is a step 120 where interrupts are enabled. Note that, in embodiments that do not use interrupts (e.g., a completely cooperative system where all processes relinquish control voluntarily), it is not necessary to execute the step 120. In that case, the step 120 is omitted as illustrated by a path 122. Following the step 120 (or the step 116 or the step 114) is a step 124 where a run_sched function is called. The run_sched function is discussed in more detail hereinafter.

Figure 8:
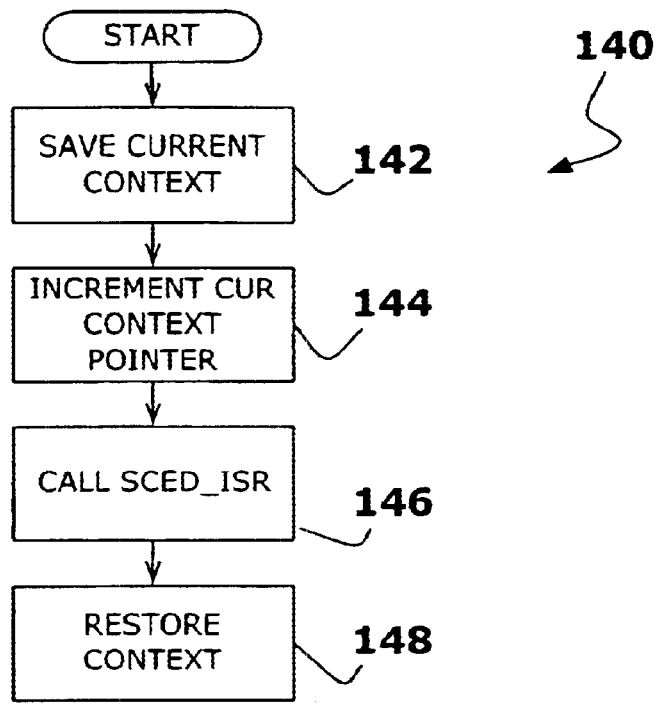
FIG. 8 is a flow chart illustrating steps performed in connection with the run_sched function used by the system described herein.

Referring to FIG. 8, a flow chart 140 illustrates steps performed in connection with implementing the run_sched function. The run_sched function is the software trap called by processes when relinquishing the processor to another process. As described elsewhere herein, it is possible for the operating system to run in an entirely cooperative mode if all of the processes execute the run_sched function at appropriate times. Not also that, in some embodiments, the run_sched function may be implemented as a software trap, depending upon the processor architecture. As a software trap, invoking the run_sched function causes the interrupts to be disabled and the contexts to nest one additional level.

Processing for the flow chart 140 begins at a step 142 where the current context is saved at a location indicated by doubly dereferencing the current context pointer 62. Following the step 142 is a step 144 where the current context pointer 62 is incremented. Following the step 144 is a step 146 where a sched_isr routine is called. The sched_isr routine that is called at the step 146 is described in more detail hereinafter. Following the step 146 is a step 148 where a restore context routine is called. The restore context routine that is called the step 148 is described in more detail hereinafter. Note that no additional processing is performed after restore context is called at the step 148. This is because, as described in more detail hereinafter, part of the processing performed by the restore context is to return from interrupt. The appropriate program counter, stack pointer, registers, etc. are all set up by the restore context routine, as described in more detail hereinafter.

Figure 9:
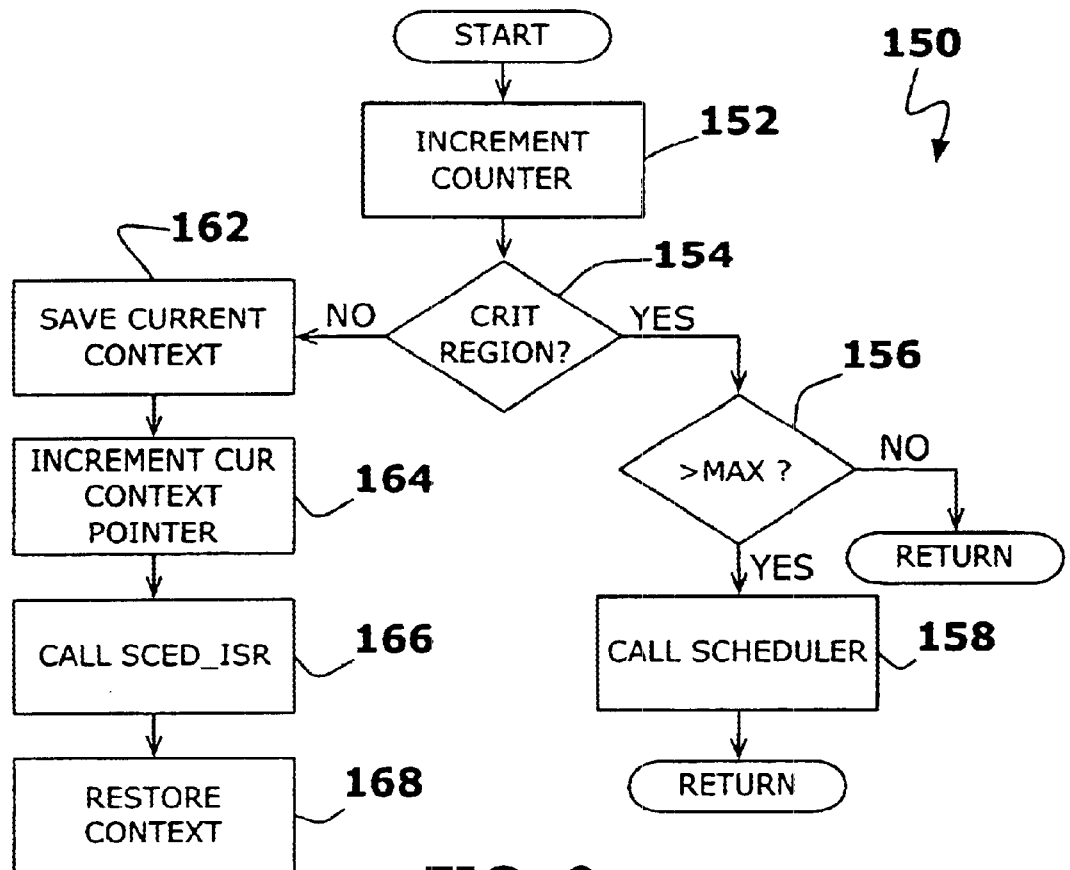
FIG. 9 is a flow chart illustrating steps performed in connection with a clock tick interrupt used in the system described herein.

Referring to FIG. 9, a flow chart 150 indicates steps performed in connection with a clock tick interrupt routine that may be entered at periodic intervals to swap processes. Note that, as discussed above, it is possible to combine the cooperative aspects of the operating system (i.e., the mechanism discussed above in connection with FIG. 8 for cooperatively running the scheduler) with the periodic interrupts that occur to run the scheduler, the operation of which is described below.

Processing begins at a first step 152 where a counter is incremented. The counter is used for system time in connection with delays and sleep timers for processes, which are described in more detail elsewhere herein. Following the step 152 is a test step 154 which determines if the current process (i.e., the process pointed to by current process pointer 72) is running in a critical region. A process that is running in a critical region sets a flag indicating that the process is not to be interrupted. The same process then may clear the flag at a later time in order to allow interruption. The mechanism for implementing process critical regions is discussed in more detail below.

If it is determined at the test step 154 that the current process is in a critical region, then control passes from the step 154 to a test step 156 where it is determined if the counter, incremented at the step 152, has exceeded a maximum value. In some embodiments, a counter is used so that, even if the current process is in a critical region, the scheduler (described below) will still run periodically to perform, for example, housekeeping functions. Thus, if the maximum value were set to ten ticks, then the scheduler would run at least every ten ticks, even if a process were running in a critical region for an amount of time much greater than the time corresponding to ten ticks.

If it is determined at the test step 156 that the counter does not exceed the maximum time, then the routine returns without invoking the scheduler. Note that, depending on the architecture of the system, the return after the step 156 may be implemented as a return from interrupt, since, as described herein, the processing of the flow chart 150 is entered by an interrupt. Alternatively, if it is determined at the test step 156 that the counter is greater than the maximum value, then control passes from the step 156 to a step 158 where the scheduler is invoked. Following the step 158 is a return (or, as discussed above, possibly a return from interrupt).

If it is determined at the step 154 that the current process that is running is not in a critical region, then control passes from the step 154 to a step 162 where the context of the current process is saved (in a location according to doubly dereferencing the current context pointer 62). Following step 162 is a step 164 where the current context pointer 62 is incremented. Following step 164 is a step 166 where the sched_isr routine is called (described below). Following 166 is a step 168 where the restore context routine (described below) is called. Just as with the restore context step 148 of FIG. 8, the restore context step 168 causes processing to not return to the code that made the call.

Figure 10:
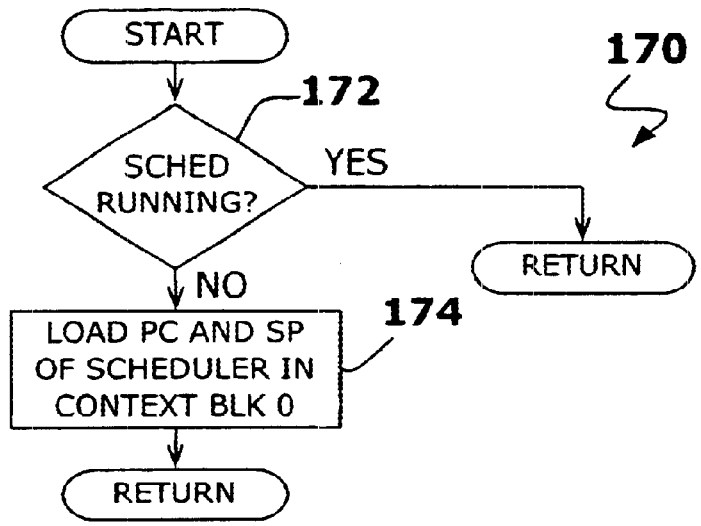
FIG. 10 is a flow chart illustrating steps performed in connection with a sched_isr function used in the system described herein.

Referring to FIG. 10, a flow chart 170 illustrates steps performed in connection with the sched_isr routine. Processing begins at a first test step 172 where it is determined if the scheduler is already running. The test at the step 172 is performed by examining a variable that is set by the scheduler. This is described in more detail below in connection with the description of the scheduler. If it is determined at the test step 172 that the scheduler is already running, then the sched_isr routine returns. Alternatively, if it is determined at the test step 172 that the scheduler is not running, then control passes to a step 174 where the scheduler starting address (program counter) and the stack pointer are loaded into the zeroth element in the array of context blocks 66.

Note that the scheduler starting address and stack pointer loaded at the step 174 may be variable so that, during run time, it may be possible to use different schedulers. That is, since the scheduler is entered according to the program counter and stack pointer, loaded at the step 174, it may be possible to have more than one scheduler and to alternate use of the schedulers based on run time considerations. Thus, in certain embodiments, the processing performed at the step 174 may include additional steps to determine which of a variety of schedulers are to run. Also note that, for some embodiments and architectures, a common stack may be used at least among the various schedulers, so that different schedulers may be used by just providing different program counters without having to also specify a stack. This may be distinguished from situations where a single scheduler runs one of a plurality of scheduling algorithms since, in such single scheduler/multiple algorithm situations, the scheduler may experience significant overhead in connection with determining which scheduling algorithm to run. In contrast, the multiple scheduler technique disclosed herein may avoid such overhead.

In one embodiment, for example, a statistical code profiler may be run on an ad-hoc basis. The profiler accumulates data on processes by running as a scheduler. The profiler is installed by simply swapping out the current scheduler's address from the scheduler pointer, and substituting the address of the profiler. The profiler does not need another context block, and shares the current scheduler's stack. When the profiler is finished after a certain amount of time, or is removed, the profiler may then swap the original scheduler's address back into the pointer.

Other forms of schedulers may be as easily installed. For example, system initialization may require that specialized processes be run which control hardware in a particular manner until the full system is able to run. The sequential nature of this may only require a very simple scheduler. Once the system is in full operation, a more complex scheduler may be switched in to allow processes to compete for CPU time. Such more complex schedulers may include priority based scheduling, rate monotonic analyzer/schedulers, process-cost auctions, and various other dynamic load balancing schemes. State information for any of these schemes would ordinarily be stored in memory that is dedicated for use by each of the scheduler functions.

Figure 11:
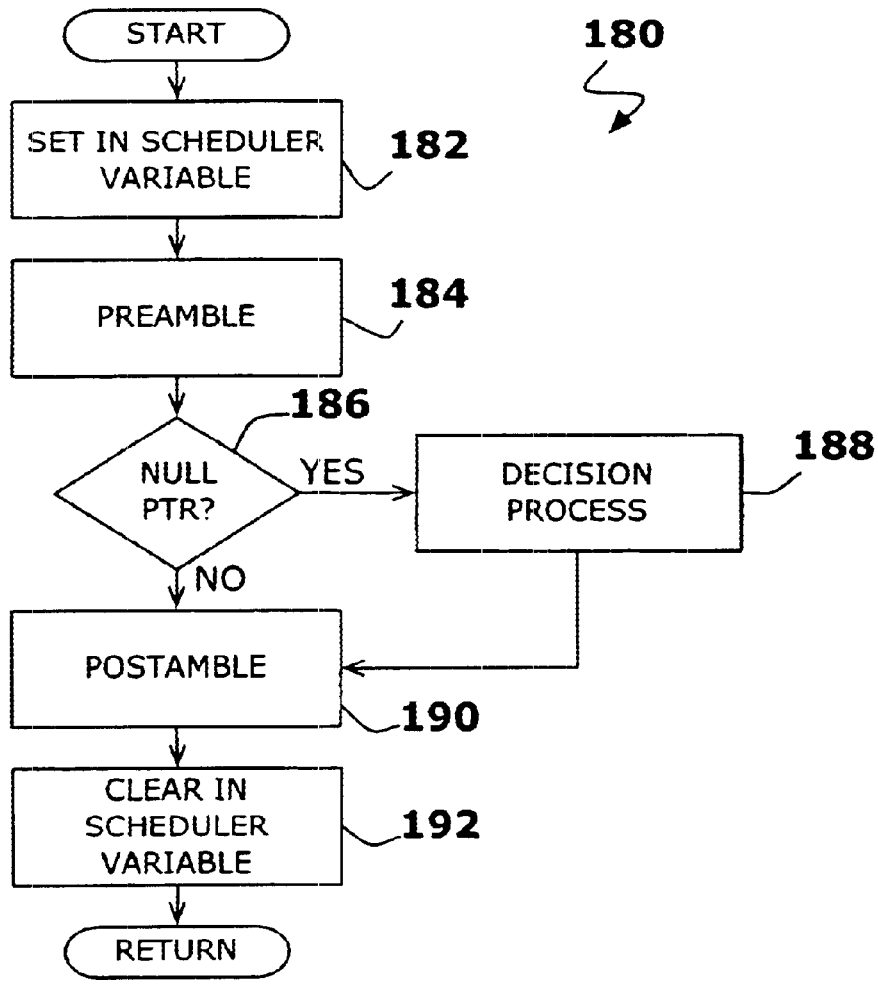
FIG. 11 is a flow chart illustrating steps performed in connection with a scheduler used in the system described herein.

Referring to FIG. 11, a flow chart 180 illustrates steps performed by the scheduler. Processing begins at a first step 182 where the variable indicated that the schedule is running is set. This variable is discussed above in connection with the test step 172 of the flow chart 170 at FIG. 10. Following the step 182 is a step 184 where the scheduler preamble is run. The scheduler preamble at the step 184 is discussed in more detail hereinafter.

Following the step 184 is a test step 186 where it is determined if the scheduler preamble has returned a NULL pointer. A NULL pointer returned by the preamble at the step 184 indicates that a new process is to be swapped in. A non-NULL pointer returned by the preamble at the step 184 indicates that the current process is not to be swapped.

If it is determined at the test step 186 that a NULL pointer has been returned by the preamble at the step 184, then control passes from the step 186 to a step 188 where a process decision is executed. The process decision at the step 188 determines the next process to be run. The processing performed at the step 188 is discussed in more detail hereinafter.

Following the step 188, or following the step 186 if the preamble at the step 184 has returned a non-NULL pointer, is a step 190 where a scheduler postamble is executed. The postamble processing at the step 190 is discussed in more detail hereinafter. Following step 190 is a step 192 where the variable that is set at the step 182, to prevent reentrance of the scheduler is cleared, thus indicating that the scheduler is no longer running.

Figure 12:
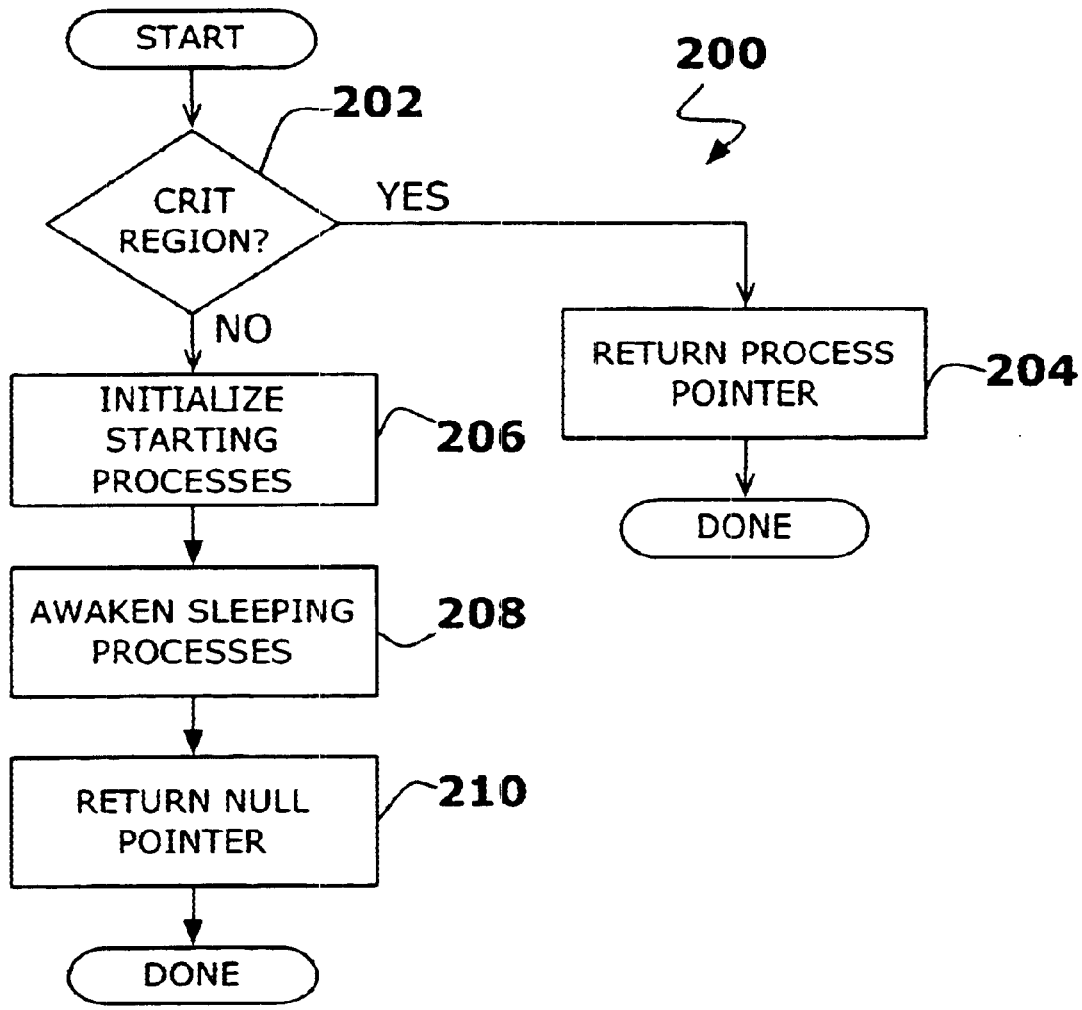
FIG. 12 is a flow chart illustrating steps performed in connection with a scheduler preamble function used in the system described herein.

Referring to FIG. 12, a flow chart 200 shows steps performed for the preamble of the scheduler at the step 184 of FIG. 11. Processing begins at a first step 202 which determines if the current process that is running is in a critical region (i.e., a region such that the process cannot be swapped out, which is set by the process, as described in more detail below). If it is determined at the test step 202 that the current process is in a critical region, then control passes from the step 202 to a step 204 where a pointer to the current process is returned (i.e., a non-NULL pointer). As discussed above in connection with FIG. 11, having the scheduler preamble return a non-NULL pointer prevents the scheduler from swapping out a process that is in a critical region.

If it is determined at the step 202 that the currently running process is not in a critical region, then control passes from the step 202 to a step 206 where all of the processes in the array of process elements 74 are examined and any process that is starting (i.e., was just loaded) is initialized. Initializing a process at the step 206 is somewhat platform specific, but may include initializing the stack pointer for the process and setting the program counter to the beginning of the code for the process. Note also that removing dead (i.e., aborted or cancelled) processes may also be performed either at the step 206 or at another appropriate step.

Following the step 206, is a step 208 where all of the processes in the array of process elements 74 are examined and any sleeping processes having an expired sleep timer are awakened. The mechanism which provides a time delayed sleep for processes is discussed in more detail below.

Following the step 208 is a step 210 where a NULL pointer is returned, indicating to the scheduler that, if possible, a new process should be scheduled.

Figure 13A:
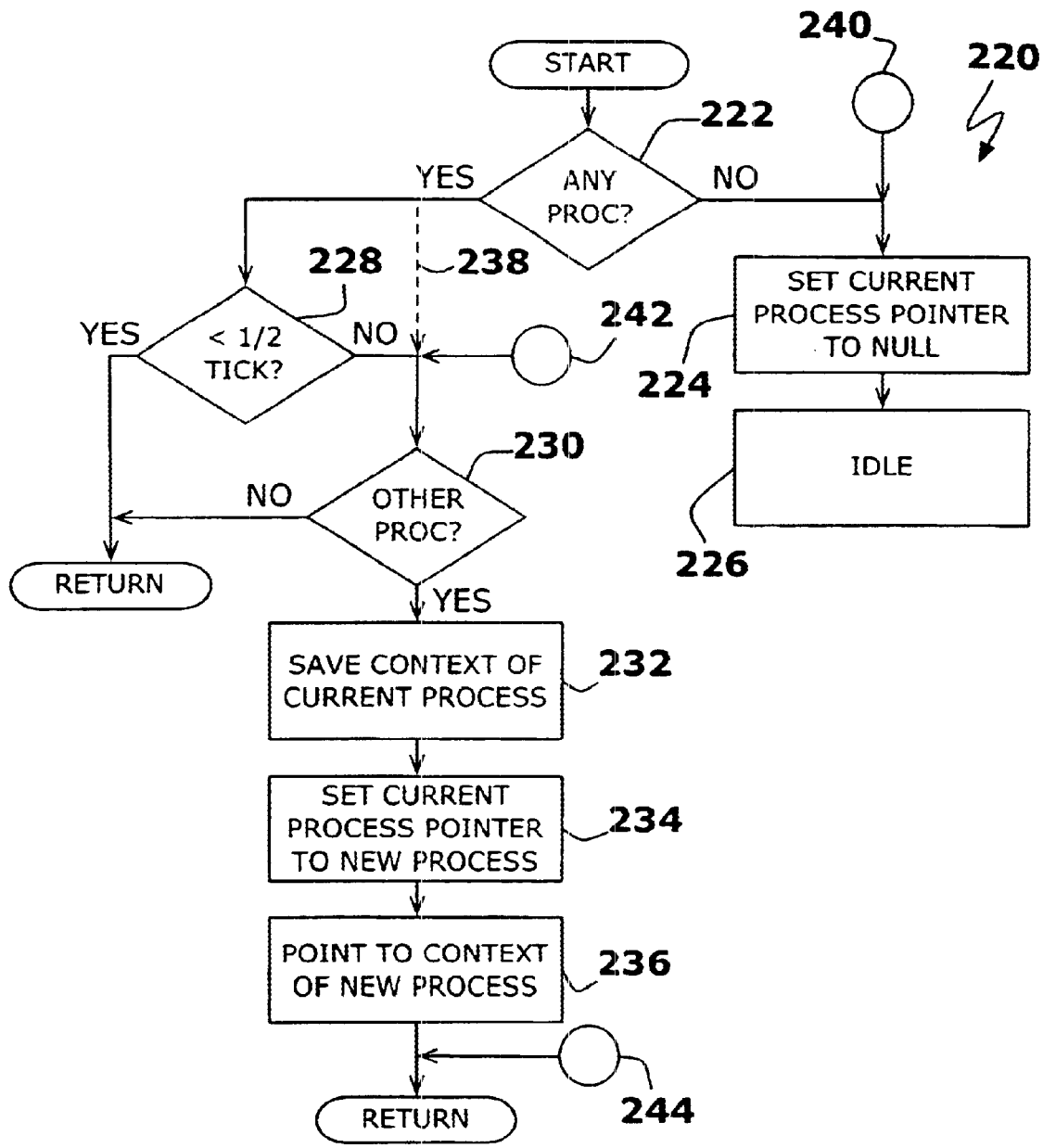
FIG. 13A is a flow chart illustrating steps performed in connection with a scheduler decision function used in the system described herein.

Referring to FIG. 13A, a flow chart 220 illustrates steps performed by the decision processing of the scheduler illustrated at the step 188 of FIG. 11. Processing begins at a first step 222 where it is determined if there are any runable processes by examining all of the processes of the array of process elements 74 to determine if there is at least one process that is not idle, sleeping, etc. If it is determined at the test step 222 that there are no processes available for running, then control passes from the step 222 to a step 224 where the current process pointer 72 is set to NULL. Following the step 224 is a step 226 representing the processor idling, to wait for an event that will cause at least one process to be placed into a runable state.

If it is determined at the test step 222 that there are processes in a runable state, then control passes from the test step 222 to a test step 228 where it is determined if the current process has run for less than one-half of a tick (i.e., less than one-half of the time between the clock tick interrupts, the timer interval), which is possible in a system where the run_sched routine is called in addition to having the clock tick interrupt. That is, the clock tick may occur almost immediately after run_sched has just swapped in a new process if, for example, the new process was swapped in after a previous process had voluntarily relinquished the processor.

The test at the step 228 involves clock slice checking, where each time a process is swapped in, the system clock value (or any similar value that varies according to the passage of time) is noted. The time value may be noted in connection with a save context and/or a restore context operation. At the step 228, the noted time value is compared to a current time value to determine how much time has passed since the current process was swapped in. If it is determined at the test step 228 that the current process has run for less than one-half of a tick (i.e., a tick's worth of time), then the current process is not swapped out and the decision portion of the scheduler is complete. Note that the test at the step 228 may use time values other than ½ tick, such as values corresponding to some other fractional amount of the timer interval and/or even values greater than a full timer interval.

If it is determined at the test step 228 that the current process that is running has run for more than one-half of a tick, then control passes from the test step 228 to the test step 230 where it is determined if there are other processes (i.e., a process other than the currently running process) capable of running. If not, then the current process (the only process eligible to run) is not swapped out and the decision portion of the scheduler is complete. Otherwise, if it is determined at the test step 230 that other processes are available to run, then control passes from the step 230 to a step 232 where the context of the currently running process is saved in the location pointed to by the doubly indirect current context pointer 62. Following the step 232 is a step 234 where the current process pointer 72 is adjusted to point to the new process that will run. Following the step 234 is a step 236 where the context of the new process is loaded and the zeroth element of the context block pointers array 64 is set to point to the context block for the new process, which is stored as part of the array of process elements 74.

In some embodiments, it may be desirable to avoid the overhead associated with clock slice checking. Note that, to the extent processes do not voluntarily relinquish the processor, the test at the step 228 becomes less necessary since processes will be swapped in preemptively, and thus will run for one tick's worth of time. In instances where clock slice checking is not performed, the test at the step 228 is not performed. This is illustrated by an alternative path 238 from the step 222 to the step 230, which avoids the step 228. FIG. 13A also shows off page connectors 240, 242, 244 that are discussed below.

Figure 13B:
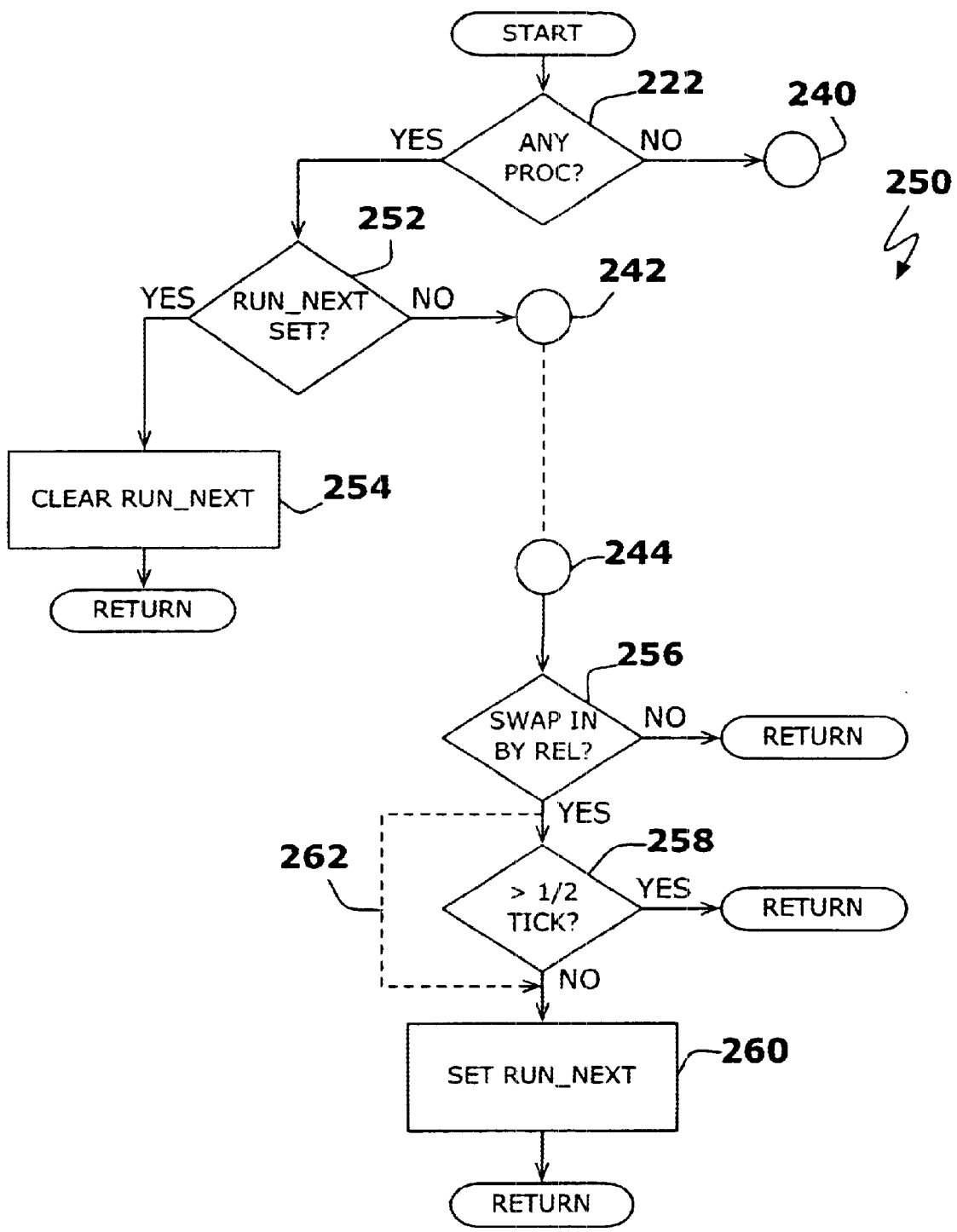
FIG. 13B is a flow chart illustrating an alternative embodiment of the scheduler decision function used in the system described herein.

Referring to FIG. 13B, a flow chart 250 illustrates steps performed in connection with an alternative embodiment of the scheduler that uses a RUN_NEXT flag to avoid process starvation. As described in more detail below, the RUN_NEXT flag is set for a process when the process is swapped in after the previous process has voluntarily relinquished the processor.

The first step 222 of the flow chart 250 is the same as that is discussed above in connection with the flowchart 220 of FIG. 13A. If it is determined at the step 222 that there are no processes to run, then, as illustrated by the off page connector 240, control passes from the step 222 to the step 224, to provide the processing discussed above in connection with FIG. 13A.

If it is determined at the step 222 that there are runable processes, then control passes from the step 222 to a test step 252 where it is determined if the RUN_NEXT flag has been set. If so, then control passes from the step 252 to a step 254 where the RUN_NEXT flag is cleared to allow the current process to be swapped out at the next clock tick. Following the step 254, processing for the scheduler is complete, since the detection of the RUN_NEXT flag indicates that the current process is not to be swapped out on the current iteration.

If it is determined at the step 252 that the RUN_NEXT flag is not set, then, as illustrated by the off page connector 242, control passes from the step 252 to the step 230 of FIG. 13A. The steps 230, 232, 234, 236 of FIG. 13A are then performed as discussed above. Following the step 236, control passes to a step 256, as illustrated by the off page connector 244. That is, instead of returning from the decision portion of the scheduler after the step 236 as discussed above in connection with FIG. 13A, processing continues at the step 256.

At the step 256, it is determined if the new process (i.e., the process swapped in by execution of the steps 232, 234, 236) is being swapped in as a result of the previous process voluntarily relinquishing the processor. This may be determined in any number of ways, such as by checking whether the scheduler was entered by preemption. If it is determined at the step 256 that the new process was not swapped in on account of the previous process releasing the processor, then the scheduler returns without setting the RUN_NEXT flag.

If it is determined at the step 256 that the new process was swapped in as a result of the previous process releasing the processor, then control passes from the step 256 to a step 258 where it is determined if there is more than ½ ticks worth of time until the new process will be preempted. This time determination is made using clock slice checking, as discussed above. Note that it is straight-forward to predict when the next clock tick will occur by, for example, calculating the intervals between the preemption interrupt. Also, other time values may be used, including time values corresponding to some other fractional amount of the timer interval and/or values corresponding to more than one timer interval.

If it is determined at the step 258 that the new process has an opportunity to run for more than ½ tick, then the scheduler returns without setting the RUN_NEXT flag.

Thus, even with the RUN_NEXT flag mechanism, a process will not be purposefully scheduled to run for more than 1½ ticks. If it is determined at the step 258 that there is not more than ½ ticks worth of time for the new process to run, control passes from the step 258 to a step 260 where the RUN_NEXT flag is set. Following the step 260, processing is complete.

In an alternative embodiment, the test at the step 258 may be avoided, as indicated by an alternative path 262. In that case, it is possible for a process to run continuously for almost two ticks. However, eliminating the step 258 avoids the overhead associated with clock slice checking. In addition, use of the RUN_NEXT flag eliminates the need for the test at the step 228 that determines if a process has run for less than ½ tick. Thus, in embodiments that use the RUN_NEXT flag and do not perform the test at the step 258, the overhead associated with clock slice checking may be eliminated altogether while still avoiding process starvation in which a process is provided with an insufficient amount of time to run.

Figure 13C:
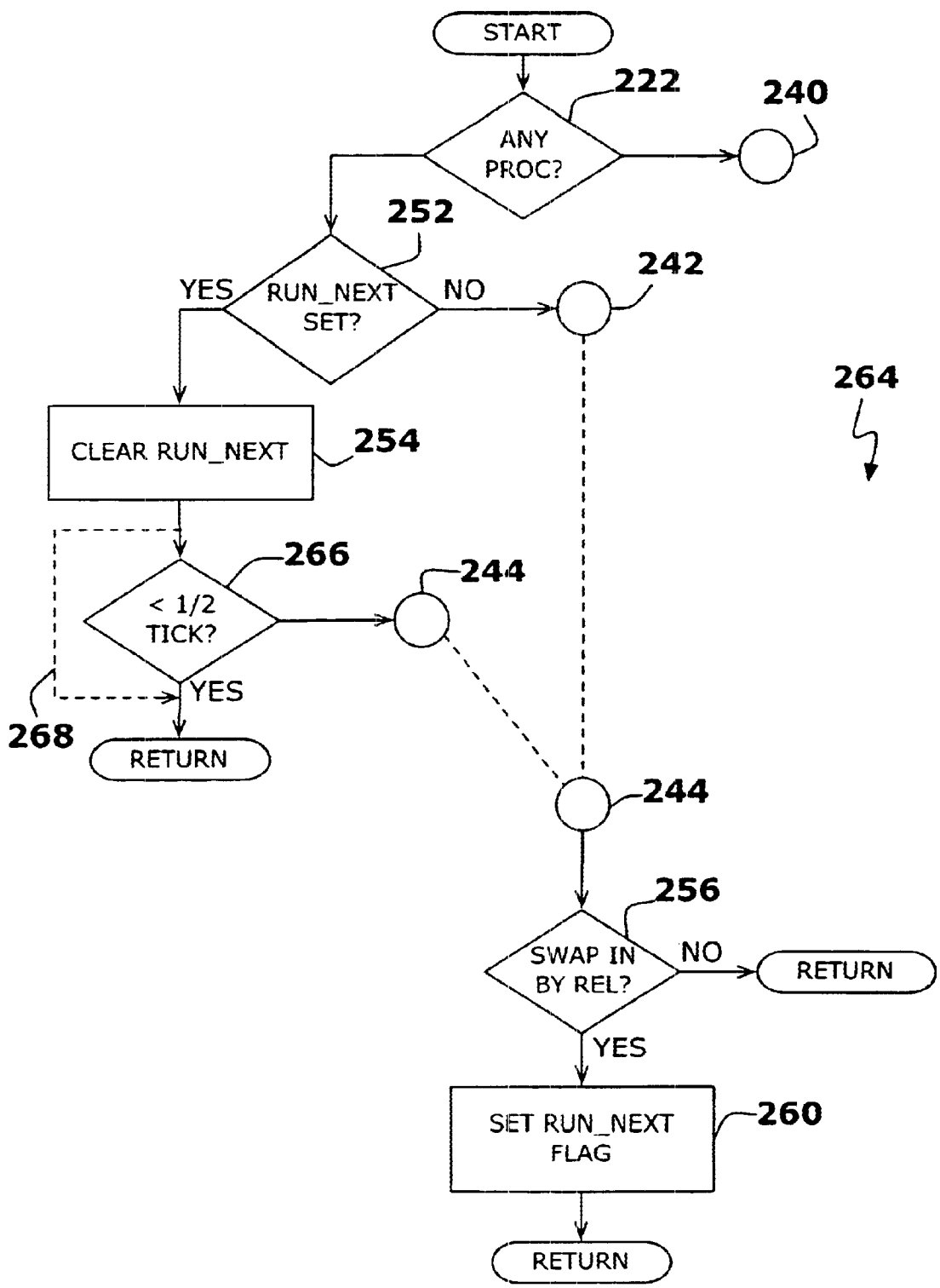
FIG. 13C is a flow chart illustrating another alternative embodiment of the scheduler decision function used in the system described herein.

Referring to FIG. 13C, another embodiment of the scheduler is illustrated using a flow chart 264. Many of the steps 222, 252, 254, 256, 260 are discussed above in connection with FIG. 13B. However, note that the flow chart 264 does not include the step 258 of FIG. 13B.

Instead, a test step 266 follows the step 254 to determine whether the RUN_NEXT flag will cause the current process to run for another iteration or not. If it is determined at the step 266 that the current process has run for less than ½ of a tick, then the current process is allowed to run for another iteration. Otherwise, as indicated by the off page connector 242, control passes from the step 266 to the step 230 to schedule another available process to run. An alternative path 268 illustrates that the test step 266 may be omitted. Note that the flow chart 264 is identical to the flow chart 250 when both of the alternative paths 262, 268 are taken.

Thus, the flow chart 250 of FIG. 13B illustrates conditionally setting the RUN_NEXT flag only if the current process will otherwise run for less than ½ of a tick. Once the RUN_NEXT flag has been set, the current process is configured to run on the next iteration without further tests with respect to the amount of time that the current process has actually run. In contrast, the flow chart 264 of FIG. 13C illustrates setting the RUN_NEXT flag unconditionally and then, when it's time to decide whether the current process should be swapped out, testing to determine whether the current process has already run for more than ½ of a tick.

Figure 14:
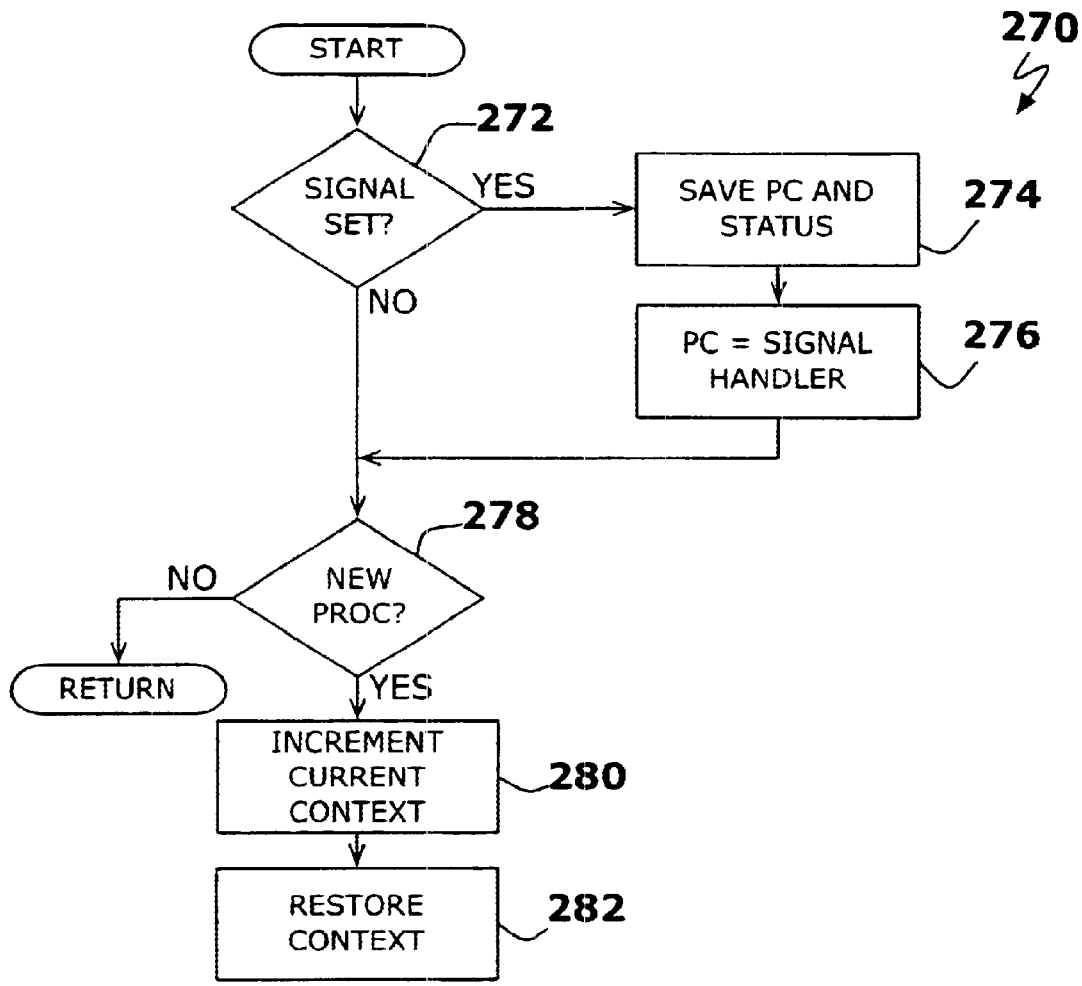
FIG. 14 is a flow chart illustrating steps performed in connection with a scheduler postamble function used in the system described herein.

Referring to FIG. 14, a flow chart 270 illustrates steps performed in connection with the postamble processing of the scheduler illustrated at the step 190 of FIG. 11. Processing begins at a first step 272 where it is determined if a signal is set on the current process (i.e., the process pointed to by the current process pointer 72). Signals are discussed in more detail below. If it is determined at the test step 272 that a signal is set on the current process, then control passes from the step 272 to a step 274 where the program counter and status of the current process is saved. Following the step 274 is a step 276 where the program counter is made to point to a routine for handling signals, which is discussed in more detail below. Following the step 276, or the step 272 if no signal is set, is a step 278 where it is determined if a new process has been swapped in (i.e., if the current process pointer 72 has changed since a previous iteration). If no new process has been swapped in, then processing for the postamble code of the scheduler is complete. Otherwise, control passes from the step 278 to a step 280 where the current context pointer 62 is incremented. Following step 280 is a step 282 where a restore context, discussed below, is performed.

Figure 15:
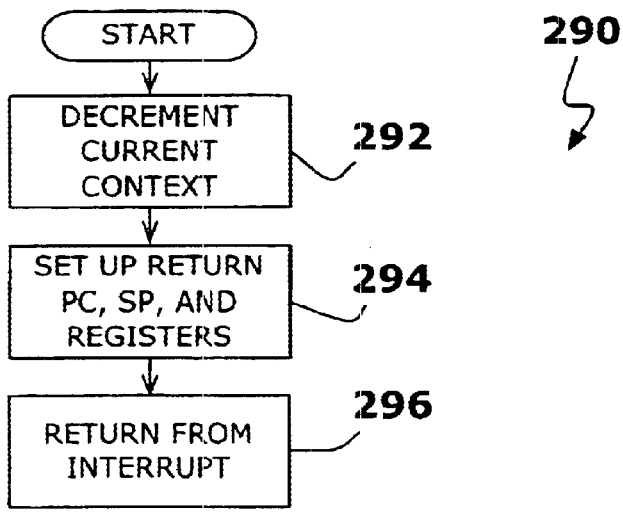
FIG. 15 is a flow chart illustrating the restore context processing used in the system described herein.

Referring to FIG. 15, a flow chart 290 illustrates steps performed in connection with the restore context routine. Processing begins at a first step 292 where the current context pointer 62 is decremented. Following the step 292 is a step 294 where the context for the process that will be running is set up using the context data associated with the process that will be running. Setting up the context is highly platform specific, but may include restoring register values, restoring the stack pointer, restoring the program counter (PC) (e.g., by placing the PC in a special register or pushing the PC on to a system stack), etc. Following the step 294 is a step 296 where a return from interrupts is executed. The set up performed at the step 294 combined with the return from interrupts performed at the step 296 causes the process to begin executing at the correct location with the context set up properly.

The system described herein may provide for various (somewhat conventional) techniques synchronizing processes, such as spin locks, wait/wakeup, semaphores, and signals. Process synchronization may be used for a wide variety of situations that arise, for example, when more than one thread must have exclusive access to a particular system resource for some period of time; or when a communications protocol needs asynchronous service, etc. The various features described below are somewhat conventional and are described herein for completeness.

A spin lock is a kernel resource which may be identified by the process id (pid) of the current owner and a count. Only one process may own a given lock at any time. A single process may hold multiple locks at the same time, however. A process may use a function call getlock to obtain a lock. If no other process owns the lock, the process may obtains the lock. The lock may be marked with the pid of the process which holds the lock, and the associated counter may be incremented from minus one to zero. If the same process attempts to obtain the lock again, the counter may be incremented. Each time the owner process calls the releaselock function, the counter may be decremented. When the counter reaches the value −1 again, the lock may be released.

If the process that calls getlock does not own the lock, the process will block and repeatedly invoke sleep(0) to allow other processes to run. Note that the requesting process is in a critical region while repeatedly invoking sleep although the sleep call will take the process out of the region until the lock is obtained. This is due to the getlock call implicitly invoking entreg( ) before looping. The region is important to insure that the process will not be preempted between the time the lock becomes available and the time when the process can get control of the lock. When the lock is obtained, there may be an implicit lvreg( ) call before the getlock call returns.

Note that if a spinning process is signaled, the signal handler for the process may run while the process is still within a critical region. When the signal hander returns, the process may continue to spin and wait for the lock. The fact that, in this case, the signal handler is running in a critical region (that is, non-preemptable) may have unintended consequences. Note that for each call to getlock a matching call to releaselock is provided. When a process exits, all locks owned by the process may be released.

Wait/wakeup synchronization may allow one or more processes to register a value along with a specified (zero or greater) number of ticks. The registration may be performed using a waitfor(N, t) call. The process(es) may block until one of the following conditions occurs: another process issues a wakeup(N) call with the value registered, the number of ticks (t) worth of time has passed, or the process is signaled. If another process issues a wakeup(N) call, all processes registered for that value will be unblocked, and the processes may see the individual invocations of waitfor( ) return a zero value indicating success. The scheduler may determine which of the processes is the next to run.

If t ticks elapse with no process issuing a wakeup(N) call, then any process having used the value t for the ticks parameter may be unblocked. The processes may see their invocations of waitfor( ) return the value negative one to indicate that the processes should check the value of errno to determine the cause of the error. In this case, errno may have the value ETIMEOUT. Note that each process registered with the value N may use a different value for t and that a process which uses the value zero for t will block forever. That is, that process will only unblock on a wakeup or a signal.

If a process has been signaled, then it will unblock. When the scheduler next runs the process, however, its signal handler will run (for the signal that was set). It is only when the signal handler function exits that the process will return from the waitfor function with the value of −1, and errno set to EINTR. Processes may register a waitfor for the same value, with different timeout parameters. When a wakeup is issued for the value, all of the processes may be awakened simultaneously. It is up to the scheduling algorithm to determine which process will in fact run next. This differs from a semaphore, in which processes are queued in the order in which the processes pend.

A semaphore may be an integer value which represents a queue of processes. The semaphore may be created by the use of a semcreate( ) function. Semaphore synchronization may allow one or more processes to pend on a particular semaphore value. That is, a process will block and wait for another process to post to that same semaphore. Each process which pends on a particular semaphore is placed into a FIFO queue of processes associated with the semaphore. Each time another process posts to the semaphore, the process at the head of the FIFO queue is unblocked. The unblocked process will run as soon as the scheduler allows it. (Note that any process may create a semaphore to which any process may pend, post, or which any process may delete using the semdelete(S) call.)

A process pends on a semaphore through the use of the sempend(S) call, where S is a valid semaphore value returned from a previously invoked semcreate( ) call. A pending process $P_0$ will not return from the sempend(S) call unless or until one of the following conditions pertains: a) Some process invokes the sempost(S) call and process $P_0$ is the head of the pending queue; or b) Some process invokes the semdelete(S) call. Note that either of these conditions may occur in any order with respect to process $P_0$ invoking sempend(S) and the same thing happens. If another process has already called sempost(S) and there are no other processes pending on that queue, then process $P_0$ will return immediately. If another process has invoked semdelete(S) then process $P_0$ will also return immediately. The two conditions are differentiated by the return value from sempend. If the semaphore is valid, the return value is 0. If the semaphore has been deleted, then the return value is −1, and errno is set to EINVAL.

If process $P_0$ invokes sempend(S) and there are other processes already pending on that semaphore, then it will block until enough sempost(S) calls have been made to move $P_0$ to the head of the queue. Only one process is ever made ready to run by a single sempost call. This is different from the wait/wakeup synchronization discussed above. In that case, all processes waiting for a particular value are unblocked simultaneously. Note that there must be the same number of sempend and sempost calls to allow all pending processes to run, but that these calls can occur in any order. Also note that the semdelete(S) call will immediately unblock all processes which are pending on queue S. The scheduler will then determine which of those processed will run next. A signal set on a process which is pending on a semaphore will not cause that process to unblock. However, when the process is allowed to run again (from either of the two conditions mentioned above), that process will run its signal handler before appearing to return from the sempend call.

Signals are a form of process-level interrupt. That is, a signal which is set on a process may cause a particular function called a signal handler to run the next time the signaled process is scheduled to run. When the signal handler function returns, the signaled process may continue to run from the point at which the signal was set. Signal handler functions may be used as the process time code for asynchronous event interrupts in the system. A typical scheme is one in which an interrupt service routine (ISR) raises a signal on a process (which can be performed very rapidly) and then exits. Since ISRs generally run with system interrupts turned off, this allows the ISRs to take necessary actions in the shortest possible time. The next time that the signaled process is scheduled, the associated signal handler registered for the process will run instead, and the necessary actions for servicing the condition flagged by the ISR will be taken. The signal mechanism thus relieves the process from having to poll for conditions set by ISRs, and makes application writing much simpler.

There are three signals for which a handler may not be registered: SIGKILL, SIGSTOP, and SIGTSTP. The SIGKILL signal causes the process to be removed from the process table, without running any atexit( ) function which it may have registered. (It is much more polite to use the endproc( ) function, unless the process is misbehaving in some way.) The SIGSTOP and SIGTSTP signals leave the process in the process table, but place it in the suspended state. That process will not run again until another signal is raised on it. (A typical value would be SIGCONT in this case, which simply allows the process to run again when scheduled.)

Signal handler functions may be registered through the use of the signal(S, f) call, where S is the signal and f is the pointer to the function which will be invoked when signal S is set. A process can de-register a signal handler function by invoking signal(S, 0) where S is the signal to de-register. Unlike Unix systems, the default activity for signals is to ignore the signal. (Under most versions of Unix, the default activity is to kill the process.) Thus, it may be safe to allow signals without registering explicit signal handlers. Signals set on a process may cause the process to become ready to run if that process is blocked on a waitfor or sleep function. Signals will not unblock a process blocked on a semaphore queue, although as soon as the process obtains the semaphore, the appropriate signal handler (if any) will run before the process appears to have returned from the sempend call.

The system described herein supports a simple, yet powerful, device driver model. In order to create a device driver, one only needs to support a single function. This function may takes the following form:

int drivercall(FDEntry *fentry, int func, void *buf int cnt, Driver *drv, int ext)

This function call is the only call required to be exported from the driver. The arguments have the following meanings:

| | |
|---|---|
| fentry | pointer to the invoking process's specific file descriptor table |
| func | function to implement (can be DRV_INIT, DRV_UNINIT, DRV_READ, DRV_WRITE, DRV_OPEN, DRV_CLOSE or DRV_IOCTL) |
| buf | buffer passed into the driver for use (could be data space for a read, a write buffer, the name of the driver for the DRV_INIT function, etc.) |
| cnt | count (usually a byte count for read or write) |
| drv | pointer to this driver's entry in the driver table |
| ext | extended data field (usually a timeout used to implement timeout functions within the driver) |

Within the driver call itself, the only thing that may be supported is that the driver returns a negative one on error.

The system described herein supports dynamically loading and unloading of drivers. The kernel may keep a table of device drivers that are currently loaded. Since the kernel is static in size, the number of drivers allowed to be loaded at any time may be determined by the size of the table at run time. When the kernel is initialized, there may be a list of functions to call to initialize various subsystems. It is during these subsystem initializations that the call to the driver's drivercall function could be called to initialize and install the driver.

Within the driver call, receipt of the DRV_INIT function can be used by the internal drv_reg call to register itself with the kernel. The call may take a pointer to the driver's drivercall function and a string to name the driver. Then, whenever the open call is used, the driver table may be scanned first for a driver with a matching name. If there is no match, the driver's drivercall function may be called with the DRV_OPEN function. If the call is successful, the calling process has a file descriptor allocated that points to the driver, and all read, write, ioctl and close functions on the file descriptor may be passed to the driver's drivercall function for processing.

In addition, the driver can take a DRV_UNINIT function and remove itself from the driver table by calling the internal drv_unreg function. Note that if any processes have an open file descriptor to this driver, the unregister function will fail. Once the driver has unregistered itself, it can do whatever is needed to shut down the hardware it services (if desired.)

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of inhibiting process starvation in a multitasking operating system, comprising:
    providing a first type of scheduling event at periodic timer intervals;
    providing a second type of second scheduling event in response to a running processes voluntarily relinquishing the processor;
    in response to the first type of scheduling event in a previous iteration, unconditionally replacing an old process with a new process; and
    in response to the second type of scheduling event in a previous iteration, replacing an old process with a new process only if the old process has run for more than a predetermined amount of time.

2. A method, according to claim 1, wherein the predetermined amount of time is one half of the timer interval.

3. A method, according to claim 1, further comprising:
    determining if the old process has run for more than a predetermined amount of time by using clock slice checking.

4. A method, according to claim 1, further comprising:
    determining if the old process is running in response to a second type of scheduling event; and
    setting a flag in response thereto.

5. A method, according to claim 4, further comprising:
    determining if the old process has run for more than a predetermined amount of time by checking the state of the flag.

6. A method, according to claim 5, further comprising:
    if the flag has been set, rerunning the old process in response to a first type of scheduling event.

7. A method, according to claim 6, further comprising:
    clearing the flag following rerunning the old process.

8. A method, according to claim 5, further comprising:
    if the flag has been set and the old process has run for less than the predetermined amount of time, rerunning the old process in response to a first type of scheduling event.

9. A method, according to claim 8, further comprising:
    clearing the flag following rerunning the old process.

10. A method, according to claim 1, further comprising:
    determining if the old process is running in response to a second type of scheduling event and if the old process has run for less than the predetermined amount of time; and
    setting a flag in response thereto.

11. A method, according to claim 10, further comprising:
    determining if the old process has run for more than a predetermined amount of time by checking the state of the flag.

12. A method, according to claim 11, further comprising:
    if the flag has been set, rerunning the old process in response to a first type of scheduling event.

13. A method, according to claim 12, further comprising:
    clearing the flag following rerunning the old process.

14. A method, according to claim 11, wherein the predetermined amount of time is one half of a timer interval.

15. Computer software that inhibits process starvation in a multitasking operating system, comprising:
    executable code that provides a first type of scheduling event at periodic timer intervals;
    executable code that provides a second type of second scheduling event in response to a running processes voluntarily relinquishing the processor;
    executable code that unconditionally replaces an old process with a new process in response to the first type of scheduling event in a previous iteration; and
    executable code that replaces an old process with a new process only if the old process has run for more than a predetermined amount of time in response to the second type of scheduling event in a previous iteration.

16. Computer software, according to claim 15, wherein the predetermined amount of time is one half of the timer interval.

17. Computer software, according to claim 15, further comprising:

executable code that determines if the old process has run for more than a predetermined amount of time by using clock slice checking.

18. Computer software, according to claim 15, further comprising:

executable code that sets a flag when the old process is running in response to a second type of scheduling event.

19. Computer software, according to claim 18, further comprising:

executable code that determines if the old process has run for more than a predetermined amount of time by checking the state of the flag.

20. Computer software, according to claim 19, further comprising:

executable code that reruns the old process in response to a first type of scheduling event if the flag has been set.

21. Computer software, according to claim 20, further comprising:

executable code that clears the flag following rerunning the old process.

22. Computer software, according to claim 19, further comprising:

executable code that reruns the old process in response to a first type of scheduling event if the flag has been set and the old process has run for less than the predetermined amount of time.

23. Computer software, according to claim 22, further comprising:

executable code that clears the flag following rerunning the old process.

* * * * *